UNITED STATES PATENT OFFICE.

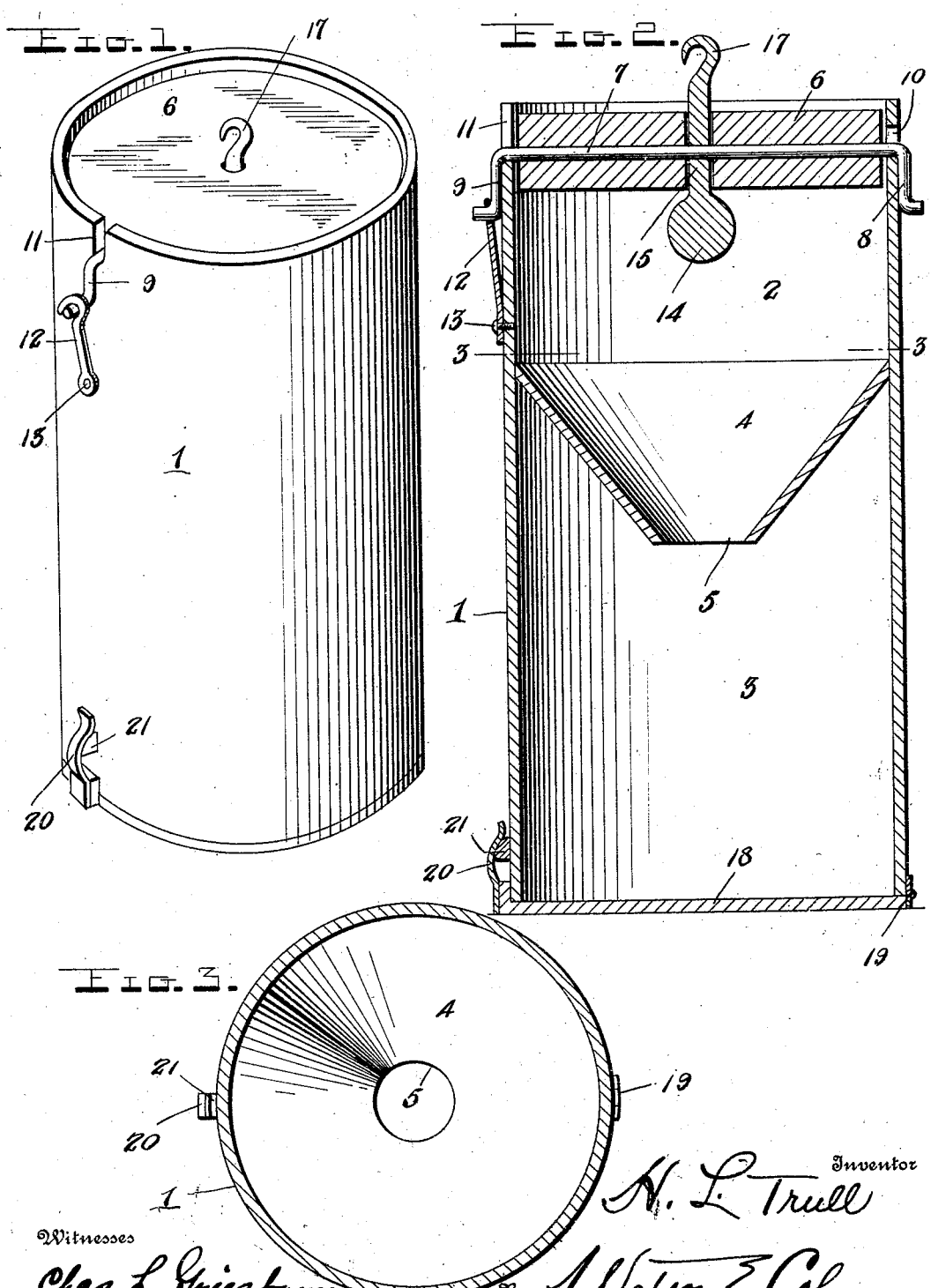

HARVEY L. TRULL, OF MART, TEXAS, ASSIGNOR OF ONE-HALF TO CLARENCE A. TRULL, OF WACO, TEXAS.

ANIMAL-TRAP.

1,072,675.  Specification of Letters Patent.  Patented Sept. 9, 1913.

Application filed December 14, 1912. Serial No. 736,823.

*To all whom it may concern:*

Be it known that I, HARVEY L. TRULL, a citizen of the United States, residing at Mart, in the county of McLennan and State of Texas, have invented certain new and useful Improvements in Animal-Traps, of which the following is a specification, reference being had to the accompanying drawings.

This invention relates to improvements in animal traps, and consists of the novel features of construction and the combination and arrangement of parts hereinafter fully described and claimed.

The object of the invention is to provide a simple and practical self setting trap of the tilting platform type and one in which the animals will be effectively retained after being caught and from which they may be easily removed.

The above and other objects of the invention are attained in the preferred embodiment illustrated in the accompanying drawings, in which—

Figure 1 is a perspective view of the improved trap; Fig. 2 is a vertical section; and Fig. 3 is a horizontal section on the line 3—3 of Fig. 2.

The invention comprises the body 1 preferably of cylindrical form and disposed vertically to provide upper and lower compartments 2, 3 which are separated by a cone or funnel-shaped partition 4, the latter projecting downwardly and having an opening 5 at its small end. The top of the body or receptacle, and hence of the upper compartment 2 is closed by a tilting platform 6 of circular shape arranged for swinging movement upon a pivot rod 7 which passes diametrically through it. The ends of the pivots 7, 8 are bent at right angles to provide cranks 8, 9 and are adapted to engage bearing openings or recesses 10, 11 formed at opposite points in the upper edge of the body so that the platform 6 may be readily removed. The opening 10 is arranged adjacent to the upper edge of the body and is adapted to receive the crank 8, which latter may be readily inserted in and removed from said opening by inclining or tilting the pivot and turning it, as will be readily understood. The other bearing opening or recess 11 is in the form of a slot formed at a diametrically opposite point in the upper edge of the body and it is adapted to receive the other crank 9 on the pivot 7, the latter being retained in said bearings 10, 11 by a catch hook 12 pivoted at 13 on one side of the body and adapted to engage the crank 9, as clearly shown in Figs. 1 and 2.

The tilting platform 6 is maintained in a horizontal position to close the top of the body by means of a centrally disposed weight 14 depending from its bottom and formed integral with the shank 15, which projects through a central opening in the platform and is retained therein by the pivot 7 which passes through a transverse opening in said shank. The upper end of the shank 15 projects above the top of the platform and is shaped to provide an integral bait hook or prong 17 on which suitable bait may be fastened.

The lower open end of the body 1 is closed by a bottom 18 which is hinged at one side, as shown at 19, and provided at its opposite side with a spring catch 20 to engage a keeper projection 21 on one side of the body.

The body or receptacle 1 of the trap may be made of suitable size which depends upon the size and kind of the animal to be caught by it. It may be made large and placed on the ground at a suitable location for catching large animals or it may be small and set in the floor of a barn or other building for catching rats and mice.

It will be seen that when an animal steps upon the platform 6 in its effort to reach the bait on the prong or hook 17, the platform will tilt and drop the animal into the upper chamber or compartment 2 and upon the funnel-shaped partition 14, which latter, being constructed of tin or other material having a smooth upper surface, will prevent the animal from taking a foot hold and will cause it to pass through the opening 5 and into the compartment or chamber 3 from which latter the animal cannot escape, owing to the shape of said partition. As soon as the animal drops from the platform 6 the weight 14 will return it to its normal horizontal position. When it is desired to remove the animals from the compartment 3, a bag may be readily placed over the lower end of the body 1 and the bottom 18 may then be opened to discharge the animals into the bag.

Having thus described the invention what is claimed is:

An animal trap comprising a cylindrical body having open ends with a bearing slot and a notch oppositely positioned at its upper end, a tilting platform positioned in the upper end of the cylindrical body, a crank positioned transversely through the platform and extending through the slot and notch with its extremities turned downwardly and outwardly to form crank portions, a shank extending vertically through the center of the platform and secured upon the crank, the shank having a weight upon its lower end and a bait hook upon its upper end, means carried by the cylindrical body for engagement with one extremity of the crank to hold the same stationary, a centrally apertured partition dividing the cylindrical body into upper and lower compartments, and means for closing the lower end of the lower compartment.

In testimony whereof I hereunto affix my signature in the presence of two witnesses.

HARVEY L. TRULL.

Witnesses:
C. A. TRULL,
V. C. McINTIRE.

Copies of this patent may be obtained for five cents each, by addressing the "Commissioner of Patents, Washington, D. C."